Patented Mar. 11, 1952

2,588,890

UNITED STATES PATENT OFFICE 2,588,890

ALLYL ALCOHOL-STYRENE COPOLYMERS

Edward C. Shokal, Oakland, and Paul A. Devlin, San Francisco, Calif., assignors to Shell Development Company, San Francisco, Calif., a corporation of Delaware No Drawing. Application April 5, 1948, Serial No. 19,176

6 Claims. (Cl. 260—407)

This invention relates to the products obtained by copolymerizing styrene with allyl alcohol in the presence of dispersed oxygen as catalyst, and to unsaturated fatty acid esters of such products.

There has been a long standing need for surface coating compositions capable of drying and setting hard in short periods of time. The speed required in modern industrial manufacture has substantially precluded use of paints containing linseed oil as the primary drying constituent because such paints dry too slowly. Rapid drying nitrocellulose lacquers were developed which dry by evaporation of volatile solvents so as to leave a film of nitrocellulose, but the resulting film is lacking in many qualities of durability. Compositions containing various resin-forming materials which set rapidly by baking have found considerable use. However, the necessity of baking such finishes at elevated temperatures is a serious disadvantage which also adds materially to the cost. The real solution of the problem lies in securing a drying oil which is capable of air drying rapidly to a hard film at ordinary temperatures without baking, which film must also have qualities of durability such as are possessed by dried linseed oil, for example.

The drying oil acid esters of polyallyl alcohol having at least five hydroxyl groups per molecule are faster drying than the corresponding unsaturated glycerides, it being shown in U. S. Patent 2,378,827 that this result is due to the fact that such polyallyl esters contain a greater number of unsaturated acyl groups than are present in the glycerides. In view of this disclosure especially, it was surprising to discover that by copolymerizing styrene with allyl alcohol in the presence of dispersed oxygen as catalyst there was obtained a copolymer which, although it contained only about 3 or 4 hydroxyl groups per molecule, gave drying oil acid ester that was substantially faster drying than the corresponding drying oil acid ester of homopolymeric allyl alcohol having five or more hydroxyl groups per molecule. Besides drying and setting hard at normal temperatures without baking in such short periods as from a few minutes to about an hour's time, the new synthetic drying oils of the present invention gave films having excellent durability. The new oils thus supply the need for satisfactory material having very fast drying properties. However, in order to obtain the desired properties for the drying ester, the copolymer is required to be prepared in a particular manner.

The process for preparing the drying oil comprises the heating of a liquid mixture of polymerizable compounds consisting only of allyl alcohol and styrene while bubbling or dispersing molecular oxygen therethrough at a temperature of about 100° C. to 200° C., and subsequently esterifying substantially completely the resulting copolymer of allyl alcohol and styrene with unsaturated higher fatty acid, i. e., esterifying until the acid number of the oil is reduced to less than about 30. In order that the drying ester will have the desired superiority in rate of drying, it is necessary that the copolymer contain proportions of combined styrene within a particular range. The copolymer of the invention contains at least 30% by weight of combined styrene. While the copolymer contains at least 30% of combined styrene in order to realize the rapid rate of drying for the unsaturated fatty acid ester therefrom, too high a percentage of styrene results in esters which have viscosities too high to be practicable. Consequently, it is desirable to use a copolymer containing not more than 80% combined styrene. While copolymers having percentages of styrene at the outer portions of this 30% to 80% range can be used for preparation of the drying esters, the properties of drying esters from copolymers containing about 35% to 60% of combined styrene are so much more superior, that this narrower range is preferred. The best drying esters of the invention are those from the copolymer of allyl alcohol and styrene containing about 50% of combined styrene in the copolymer.

The copolymer needed for preparation of the drying ester is produced by heating a mixture of allyl alcohol and styrene for about 2 to 10 hours at 100° C. to 200° C. while bubbling a slow stream of gaseous oxygen through the mixture. Since the copolymerization requires the oxygen to be brought into intimate contact with a liquid mixture of the compounds, and since the temperature of operation is above the boiling point of at least allyl alcohol, superatmospheric pressure sufficiently high to maintain the mixture in liquid phase is employed. Preferably, a pressure of 150 to 400 pounds per square inch of pressure is used especially when employing the preferred temperature of 120° C. to 150° C. By effecting the copolymerization in a closed pressure vessel or bomb which is fitted with a gas release valve set at the operating pressure, the contents in the reaction vessel are easily maintained at the desired pressure by pumping gaseous oxygen into the bomb in such a manner that the gaseous oxygen bubbles through the liquid contents thereof. The amount of gaseous oxygen bubbled through the mixture may be varied over wide limits with little difference in effect other than increasing the rate of polymerization somewhat with the corresponding amounts of oxygen. The efficiency of the copolymerization is aided by using an elongated reaction vessel in which the oxygen is introduced in the bottom thereof through a spray nozzle having many openings so as to produce a large number of small oxygen bubbles. Ordinarily at least two volumes of oxygen (S. T. P.) per volume of liquid mixture of polymerizable compounds per hour are used. This rate can be increased to 20 volumes or 200 volumes of oxygen if desired and may also be less than 2 volumes, although the rate of copolymerization will be slow below such an amount of oxygen. However, the presence of oxygen is essential to formation of the desired copolymer since merely heating the mixture of styrene and allyl alcohol in the absence of oxygen results in formation of homopolymeric styrene without appreciable copolymerization of the allyl alcohol therewith. While pure oxygen may be used as the catalyst, air is ordinarily preferred for reasons of economy. If desired, oxygen diluted with inert gas such as carbon dioxide, methane or nitrogen may be used.

The proportions of styrene and allyl alcohol used in the mixture of copolymerizable compounds are chosen so as to obtain a copolymer containing the desired percentage of combined styrene. In effecting the process of the invention it was found that the percentage of styrene contained in the resulting copolymer does not correspond to the percentage contained in the monomer mixture from which the copolymer is formed. Apparently this result is caused by the much greater speed of the copolymerizing reaction of the styrene than that of the allyl alcohol. Thus, a starting liquid mixture of allyl alcohol containing about 10% by weight of styrene produces a copolymer containing about 30% of styrene when the copolymerization is conducted until there is a 20% to 40% conversion to copolymer which is usual. If the starting mixture of allyl alcohol contains about 40% of styrene the resulting copolymer will contain about 80% of combined styrene. Consequently, in order to obtain the copolymer containing 30% to 80% of combined styrene, there is used a mixture of allyl alcohol containing 10% to 40% of styrene. In order to secure the much more preferred copolymer containing 35% to 60% combined styrene, a monomer mixture is used consisting of allyl alcohol and 15% to 25% styrene. The best copolymer is secured from a starting mixture consisting of about 80% allyl alcohol and 20% styrene.

The amounts of monomers copolymerizing may be better controlled by continuously or intermittently introducing styrene into the reaction mixture during the copolymerization. This expedient enables a copolymer to be obtained having a more uniform composition and is thus a desirable manner of operation in executing the process of the invention.

Owing to the rather severe conditions which are necessary to effect the copolymerization of the allyl alcohol with the styrene, there is an appreciable destruction of hydroxyl groups contained in the combined allyl alcohol of the copolymer. Consequently, the novel copolymer of the invention does not contain as many hydroxyl groups per molecule as would be expected from the proportion of combined styrene in the copolymer. The copolymer having about 30% to 80% of combined styrene contains about 50% to 60% of the theoretical hydroxyl groups which would be expected. However, in spite of the fact that there should be fewer hydroxyl groups per molecule with corresponding proportions of combined styrene, and even though the copolymer does not contain the theoretical number of hydroxyl groups, it was found that the copolymer of the invention contains an average of about 3 to 4 hydroxyl groups per molecule regardless of the percentage of combined styrene in the copolymer when it contains from about 30% to 80% combined styrene. The copolymer having this advantageous and unexpected property is a brittle solid at room temperature which does not change to an infusible material upon further heating with or without the presence of a polymerization catalyst. The properties of being fusible permit preparation therefrom of the drying esters, which preparation would be impossible if the copolymer became infusible.

The drying esters of the invention are prepared by esterifying the copolymer with the unsaturated fatty acids. In order to effect the desired esterification, about equivalent quantities of the copolymer and unsaturated fatty acid are mixed and heated at about 170° C. to 250° C. in an inert atmosphere and the formed water of esterification is allowed to distill therefrom. By equivalent quantities of the copolymer and unsaturated fatty acid, reference is made to stoichiometric proportions such that there is about one hydroxyl group for each carboxylic acid group present in the initial mixture. Thus, for example, in esterifying a copolymer having a hydroxyl value of 0.55 equivalent of hydroxyl per 100 grams with unsaturated fatty acids from linseed oil having an acid number of about 199 (equivalent weight=282), there is used about 155 parts by weight of acid for each 100 parts by weight of the copolymer. The use of excess acid is ordinarily to be avoided. In some cases it may, however, be desirable to have present about 10% to 20% excess of copolymer. The esterification is conveniently effected in a kettle fitted with a stirrer and distilling column. An inert gas such as carbon dioxide or nitrogen is bubbled through the esterifying mass at a slow rate to aid in removal of the water. The heating is continued until the esterification is substantially complete, which fact may be readily ascertained by determining the acid number of the reaction mixture. The esterification is continued until the acid number is reduced to about 30 or less.

In preparing the synthetic drying oil there may be used any of the unsaturated fatty acids of 12 to 20 carbon atoms having an iodine number of 85 or higher. While an ester having drying properties may be prepared from fatty acids containing a single olefinic bond such as, for example, oleic acid, lauroleic acid, palmitoleic acid, or gadoleic acid, it is preferable to employ a more unsaturated fatty acid such as linoleic or linolenic acid. Particularly suited are the drying oil fatty acids obtained as a mixture of individual acids by hydrolysis of natural drying oil such as linseed oil, soya bean oil, dehydrated castor oil, perilla oil and the like. Also the unsaturated fatty acids obtained by treating drying oils so as to effect conjugation of the double bonds as by alkali isomerization are very suitable for preparation of the synthetic drying esters of the invention.

In effecting the esterification, especially with drying oil fatty acids, care is needed to avoid over-heating or unduly prolonging the heating after substantially complete esterification because the formed ester will body and eventually gel. It is sometimes advantageous to deter or prevent the danger of gelling by effecting the esterification with from about 10% to 50% of kerosene present in the reaction mixture.

It is at times desirable to modify the synthetic drying oil by effecting the esterification with a mixture of the unsaturated fatty acid and a dicarboxylic acid or anhydride such as maleic anhydride, phthalic anhydride, fumaric acid, sebacic acid, succinic acid, etc. When a dicarboxylic acid is used in conjunction with the unsaturated fatty acids, the proportions of the acids are adjusted so there is about one equivalent of the mixed fatty acid and dicarboxylic acid per hydroxyl equivalent of the copolymer. Ordinarily, up to about 50% by weight of dicarboxylic acid in the mixture of acids are used. If desired other polyhydric alcohols may be used in admixture with the copolymer in forming the ester such as glycerin, ethylene glycol, diethylene glycol, peneterythritol, dipentaerythritol, etc.

For the purpose of illustrating the invention in greater detail, the following examples are given.

Example I

Copolymerization of styrene and allyl alcohol was effected in a one-liter nickel-lined pressure bomb equipped with a stirrer and fitted with a stainless steel tube enabling air to be bubbled through the liquid contents of the bomb. The bomb was charged with about 635 grams of material consisting of 10% of styrene and 90% of allyl alcohol. The copolymerization was effected at about 125° C.±5° C. in a 4 hour period during which air was continuously bubbled through at such a rate that the total exit gas amounted to about 6.7 cu. ft. (S. T. P.). The pressure in the bomb during the copolymerization was 260 pounds per square inch. The treatment gave a crude liquid mixture weighing about 647 grams. The product was subjected to rapid distillation at 1 mm. pressure up to a temperature of about 110° C. The amount of copolymer recovered indicated a conversion of about 25%. A material balance showed that the copolymer contained about 38% of combined styrene. The molecular weight was 479. Analysis showed the hydroxyl value of the copolymer to be 0.55 equivalent of hydroxyl per 100 grams. This indicates an average of about 2.6 hydroxyl groups per molecule.

Example II

The copolymer prepared as described in Example I was esterified with linseed oil fatty acids. About 10.2 parts by weight of the copolymer was dissolved in 15.7 parts of linseed fatty acids in a distilling vessel. The reaction mixture was blanketed with an atmosphere of carbon dioxide and heated to 230° C. during one-half hour's time. The temperature was maintained at 230° C. for a total time of 6 hours while bubbling a slow stream of carbon dioxide through the reaction mixture. During this time, the reaction mixture remained clear and homogeneous. The acid number of the reaction mixture was determined at intervals with the following results:

| Hours heating at 230° C. | Acid No. |
| --- | --- |
| 1 | 51.4 |
| 3 | 34.6 |
| 5 | 23.6 |
| 6 | 20.1 |

The resulting ester had a Gardner viscosity of 25 and a Gardner-Holdt color of 18+.

The drying properties of the ester were tested in the following manner: A 50% solution of the drying ester in a paraffinic petroleum distillate having a boiling range of about 315–400° F. was prepared. To the solution was added 0.05% cobalt as cobalt naphthenate based on the weight of drying ester. The solution was then aged for 24 hours. The aged solution was applied to a plate glass panel with a doctor blade having a clearance of 0.005 inch. The panel was dried in a cabinet wherein air circulated at 25° C. and 50% relative humidity.

Frequent observations were made of the drying film and the times were noted for three tests of drying and hardening. The first of these was the time required for the film to set to touch. The film was "set to touch" when it did not adhere to the finger after application of gentle pressure. The film was considered "dried hard" when, after squeezing the panel between the thumb and forefinger, no movement of the film was noticeable nor any imprint of the finger was observable. The final, most severe test of hardness and drying was the time when the film became "cotton-free." A film was deemed cotton-free when, upon being forcefully dabbed with a wad of absorbent cotton, no cotton fibers adhered to the film. The cotton-free test is very severe since the film must have completely hardened so that no minute areas remain having any residual stickiness or softness. Some paints and varnishes containing inferior ingredients never do harden sufficiently to pass this test even months after application. Further details of these drying tests will be found in the book of Henry A. Gardner, "Physical and Chemical Examination of Paints, Varnishes, Lacquers and Colors," 1939, pp. 106–107.

The film of the synthetic drying oil prepared and dried as described above was found to set to touch in only 80 minutes, to have dried hard in 3 hours and 40 minutes, and become cotton-free in 6 hours and 15 minutes. In comparison, a film from linseed oil prepared in the same way and dried under identical conditions set to touch in 3 hours and 30 minutes, dried hard in 12 hours, but had still not become cotton-free after 30 days' time.

The Sward hardness of the film from the synthetic drying oil measured as follows: 9 after one week; 10 after two weeks; 12 after four weeks. The linseed oil film gave a Sward hardness of 2 after one week, and remained the same after two and four weeks.

In order to test the durability of the dried film of the synthetic drying ester, it was subjected to a water-resistance test. When films are immersed in cold or boiling water they may have a tendency to lose their glossiness and become dull. The dulling tests were conducted in the following manner. The 50% solution drying oil described above was flowed on tinned steel panels. The effect of contact with cold water was determined by allowing the coated panel to dry at room temperature for 10 days after which the panel was immersed half way in water for 10 days. The panel was then removed and the degree of dulling was observed to be moderate. Ester films of good quality tend to recover their glossiness after removal from contact with water. The coated panel of the synthetic drying oil was observed 3 days after removal from the water and it was found that the dulling was only slight at that time.

The effect of boiling water was determined by drying a coated panel for one week, after which it was immersed half way in boiling distilled water for 15 minutes. This caused no dulling of the film. Observation of the extent of recovery 3 days later, of course, also showed no dulling and the same glossiness as before immersion in the boiling water.

When panels coated in the same way with a film from linseed oil were subjected to the same tests it was found that the dulling of the film after removal from the cold water was very heavy and the recovery 3 days later showed the degree of dulling to still be heavy. A panel coated with a dried film from linseed oil showed very heavy dulling in the boiling water test although the recovery 3 days later resulted in the film having only moderate dulling.

The fast drying qualities of the drying oil acid esters of the invention and the excellent durability of the dried films thereof are evident from the foregoing findings and comparisons with linseed oil which is a recognized standard drying oil.

The rapid drying qualities of the esters of the invention are further illustrated by the results summarized in the table below. The polymers were prepared in the same manner as described in Example I and for purposes of comparison there was used varying proportions of styrene and allyl alcohol including allyl alcohol alone. The homopolymeric allyl alcohol and the copolymers of allyl alcohol and styrene were then esterified substantially completely with the mixtures of fatty acids obtainable by hydrolysis from linseed oil, the esterification being effected in the same manner as described in Example II. The synthetic drying oils were tested for drying qualities and hardness of the resulting film.

ester which comprises heating a liquid mixture of polymerizable compounds consisting of allyl alcohol and 10% to 40% styrene at 100° C. to 200° C. while bubbling oxygen therethrough, and subsequently substantially completely esterifying the resulting copolymer with drying oil fatty acid.

3. A process for the production of a drying ester which comprises heating a liquid mixture of polymerizable compounds consisting of allyl alcohol and 15% to 25% styrene at 120° C. to 150° C. while bubbling oxygen therethrough under a pressure of 150 to 400 pounds per square inch, and subsequently esterifying substantially completely the resulting copolymer with linseed oil fatty acid.

4. A process for the production of synthetic drying oil which comprises heating a liquid mixture of polymerizable compounds consisting of allyl alcohol and about 20% styrene at about 125° C. while bubbling air therethrough under a pressure of about 260 pounds per square inch, and subsequently esterifying substantially completely the resulting copolymer with linseed oil fatty acid.

5. A process for the production of a drying ester which comprises heating a liquid mixture of polymerizable compounds consisting of allyl alcohol and 15% to 25% styrene at 120° C. to 150° C. while bubbling oxygen therethrough under a pressure of 150 to 400 pounds per square inch, and subsequently esterifying substantially completely the resulting copolymer with dehydrated castor oil fatty acid.

6. A process for the production of a drying ester which comprises heating a liquid mixture of

| Per Cent Styrene | | Polymer OH Val. eq./100 grams | Linseed Oil Fatty Acid Ester of Polymer | | | | | | | |
|---|---|---|---|---|---|---|---|---|---|---|
| | | | Acid No. | Gardner-Holdt Visc. | Drying Time (Min.) | | | Sward Hardness | | |
| Feed | Polymer | | | | Set to Touch | Dried Hard | Cotton Free | 1 Week | 2 Weeks | 4 Weeks |
| 0 | 0 | 0.87 | 9.6 | V | 95 | 135 | 360 | 9 | 8 | 10 |
| 5 | 23 | 0.53 | 9.1 | Z3–Z4 | 85 | 220 | 270 | 12 | | |
| 10 | 31 | 0.69 | 12.6 | Z1 | 60 | 170 | 270 | 11 | 14 | 14 |
| 20 | 52 | 0.37 | 19.6 | Z8 | 60 | | 180 | 15 | 18 | 21 |
| 40 | 80 | 0.21 | 15.7 | >Z10 | 10 | 180 | 150 | 18 | 19 | 18 |
| Linseed oil | | | | | 210 | 720 | >30 days | 2 | 2 | 2 |

The above table shows the superior rate of drying possessed by the esters of the invention in comparison to the corresponding drying esters of homopolymeric allyl alcohol or linseed oil. Furthermore, the resulting dried films are harder for the esters from the copolymer than those from the homopolymer or from linseed oil.

We claim as our invention:

1. A process for the production of a drying ester which comprises heating a liquid mixture of polymerizable compounds consisting of allyl alcohol and 10% to 40% styrene at 100° C. to 200° C. while bubbling oxygen therethrough, and subsequently esterifying substantially completely the resulting copolymer with unsaturated fatty acid of 12 to 20 carbon atoms having an iodine number of at least 85.

2. A process for the production of a drying polymerizable compounds consisting of allyl alcohol and 10% to 40% styrene at 100° C. to 200° C. while bubbling oxygen therethrough, and subsequently esterifying substantially completely the resulting copolymer with drying oil fatty acid and a dicarboxylic acid anhydride.

EDWARD C. SHOKAL.
PAUL A. DEVLIN.

REFERENCES CITED

The following references are of record in the file of this patent:

UNITED STATES PATENTS

| Number | Name | Date |
|---|---|---|
| 2,378,827 | Bradley | June 19, 1945 |
| 2,441,515 | Snyder | May 11, 1948 |
| 2,479,516 | Rust | Aug. 16, 1949 |